(12) United States Patent
Mo et al.

(10) Patent No.: US 8,792,517 B2
(45) Date of Patent: Jul. 29, 2014

(54) DISTRIBUTED SCHEDULER DESIGN FOR MULTIUSER DETECTION ENABLED WIRELESS MOBILE AD-HOC NETWORKS

(75) Inventors: Shaomin Mo, Montville, NJ (US); John A. Gu, Rockaway, NJ (US); John A. Tranquilli, Jr., Merrimack, NH (US); Joseph Farkas, Merrimack, NH (US); Ming Luo, Fairfax, VA (US); Reza Ghanadan, Berkeley Heights, NJ (US)

(73) Assignee: Collision Communications, Inc., Peterborough, NH (US)

( * ) Notice: Subject to any disclaimer, the term of this patent is extended or adjusted under 35 U.S.C. 154(b) by 189 days.

(21) Appl. No.: 13/090,435

(22) Filed: Apr. 20, 2011

(65) Prior Publication Data
US 2012/0250632 A1    Oct. 4, 2012

Related U.S. Application Data

(60) Provisional application No. 61/327,907, filed on Apr. 26, 2010.

(51) Int. Cl.
*H04L 12/413* (2006.01)
*H04W 74/08* (2009.01)

(52) U.S. Cl.
CPC .................................. *H04W 74/0841* (2013.01)
USPC ......................................................... 370/445

(58) Field of Classification Search
CPC .................... H04W 74/0841; H04W 74/0833; H04W 28/04; H04W 74/0816; H04B 1/7105
USPC ........... 370/329, 346, 431, 445; 455/450-454
See application file for complete search history.

(56) References Cited

U.S. PATENT DOCUMENTS

| | | | |
|---|---|---|---|
| 7,016,371 | B1 | 3/2006 | Petranovich |
| 7,245,673 | B2 | 7/2007 | MacLeod |
| 2002/0070845 | A1 | 6/2002 | Reisinger et al. |
| 2002/0163978 | A1 | 11/2002 | Doetsch et al. |
| 2003/0012176 | A1 | 1/2003 | Kondylis et al. |
| 2005/0192037 | A1 | 9/2005 | Nanda |
| 2005/0201340 | A1 | 9/2005 | Wang et al. |
| 2006/0215611 | A1* | 9/2006 | Nakagawa et al. ........... 370/332 |
| 2008/0268855 | A1 | 10/2008 | Hanuni et al. |

(Continued)

FOREIGN PATENT DOCUMENTS

| | | |
|---|---|---|
| EP | 1638265 | 6/2006 |
| JP | 2000-252918 A | 9/2000 |
| WO | 00-71843 A2 | 11/2000 |

OTHER PUBLICATIONS

International Preliminary Report on Patentability for corresponding PCT patent application No. PCT/US2011/033355 filed Apr. 21, 2011, (references previous submitted in IDS filed Jan. 21, 2012).

(Continued)

*Primary Examiner* — Paul H Masur

(57) ABSTRACT

In the method for operating an interference multiple access communications system, wherein the improvement comprises the steps of employing a distributed scheduler within a Media Access Controller (MAC) for Multiuser Detection (MUD) enabled Mobile Ad-hoc Networks (MANETS) to increase spectral efficiency by increasing spectral use and providing a way to dynamically allocate virtual channels to achieve maximum channel reuse in different network topologies and different link patterns and to ameliorate any hidden or exposed node problems.

21 Claims, 7 Drawing Sheets

(56) References Cited

U.S. PATENT DOCUMENTS

| | | |
|---|---|---|
| 2009/0185489 A1* | 7/2009 | Ruffini et al. ............... 370/237 |
| 2009/0201860 A1 | 8/2009 | Sherman |
| 2009/0213815 A1* | 8/2009 | Sherman et al. ............ 370/336 |
| 2009/0262710 A1 | 10/2009 | Doi et al. |
| 2009/0310619 A1* | 12/2009 | Brommer ..................... 370/449 |
| 2009/0313310 A1 | 12/2009 | Thome et al. |
| 2010/0008247 A1 | 1/2010 | Kwon et al. |
| 2010/0011231 A1 | 1/2010 | Banerjea et al. |
| 2010/0054228 A1 | 3/2010 | Michaels |
| 2010/0265955 A1 | 10/2010 | Park et al. |
| 2011/0051674 A1* | 3/2011 | Niedzwiecki et al. ....... 370/329 |
| 2012/0106522 A1 | 5/2012 | Reumerman et al. |

OTHER PUBLICATIONS

PCT Search Report of co-pending PCT Application No. PCT/US2011/033355 mailed Dec. 28, 2011.

JP Office Action dated Nov. 29, 2011 against JP Patent Application No. 2009-098246; translation by Meisei International Patent Firm.

EP Office Action dated Jan. 18, 2011 against (related) EP Patent Application No. 03817679.8; BAE Systems Information and Electronic Systems Integrations, Inc. (Applicant).

Baines, S.J. et al., "Double window multi-user detection for asynchronous DS-CDMA", IEEE 1996, Electronic Letters, Nov. 21, 1996, vol. 32, No. 24, pp. 2199-2201.

Damnjanovic, A. et al., "Iterative Multiuser Detection/Decoding for Turbo Coded CDMA Systems", IEEE Communications Letters, vol. 5, No. 3, Mar. 2001, pp. 104-106.

Wang, X. et al., "An Overlapping Window Decorrelating Multiuser Detector for DS-CDMA Radio Channels", IEEE Transactions on Communications, vol. 49, No. 8, Aug. 2001, pp. 1488-1495.

Medium Access in Spread-Spectrum Ad-hoc Networks with Multiuser Detection, K. Kusume, et. al, Eurasip Journal on Advances in Signal Processing, vol. 2009.

Multiuser Detection Based MAC Design for Ad-hoc Networks, IEEE Trans. On Wireless Communications, vol. 8, No. 4, pp. 1836-1846, Apr. 2009.

Scheduling Optimization in Multiuser detection based MAC design for Networks, M. Bouharras, et. al, IEEE LCN, Montreal, Canada, Oct. 2008.

ADHOC MAC: a new, flexible and reliable MAC architecture for ad-hoc networks, F. Borgonovo, et. al,IEEE WCNC, New Orleans, LA, Mar. 2003.

MUD Enabled Media Access Control for High Capacity, Low-latency Spread Spectrum Communications,Y. Eisenberg, et. al, IEEE MILCOM, Orlando, FL, Oct. 2007.

Interference Multiple Access Wireless Network Demonstration Enabled by Real-Time Multiuser Detection, R. Learned, et. al,IEEE Radio and Wireless Symposium, Orlando, FL, Jan. 2008.

DRAFT Standard for Local and Metropolitan Area Networks, Part 16: Air Interface for Broadband Wireless Access Systems, IEEE Standard P802, Mar. 16, 2007. See figure 262; section 6.1, 8.4.4, 8.4.7, 8.4.10, 6.3.17.2.

Mo, S., et al., "Distributed Scheduler Design for Multiuser Detection Enabled Wireless Mobile Ad-Hoc Networks," IEEE MILCOM (Oct. 2010).

Farkas, J., et al., "Power Aware Scheduling and Power Control Techniques for Multiuser Detection Enabled Wireless Mobile Ad-Hoc Networks," IEEE MILCOM (Oct. 2010).

\* cited by examiner

DISTRIBUTED SCHEDULER DESIGN FOR MULTIUSER DETECTION ENABLED WIRELESS MOBILE AD-HOC NETWORKS

RELATED APPLICATIONS

This Application claims rights under 35 USC §119(e) from U.S. Application Ser. No. 61/327,907 filed Apr. 26, 2010, the contents of which are incorporated herein by reference.

STATEMENT OF GOVERNMENT INTEREST

This invention was made with United States Government support under Contract No. W15P7T-06-C-P423 awarded by the United States Army. The United States Government has certain rights in this invention.

FIELD OF THE INVENTION

The present invention relates to communication systems, and more particularly to multiuser detection enabled ad-hoc networks.

BACKGROUND OF THE INVENTION

There is a need for military and commercial wireless radio networks that can operate in dynamic environments while supporting high spectral efficiency with throughput guarantees and low latency. This is particularly challenging in wireless mobile ad-hoc networks (MANETs), but simultaneous use of a frequency by multiple users enabled by multiuser detection techniques can achieve these goals.

While multiuser detection (MUD) technology promises to address the need for many to share a single frequency, realizable multiuser detection systems for ad-hoc networks of handheld units do not have the computer power to perform optimal joint detection on completely random transmissions.

There is therefore a need of some kind of scheduling for maximum channel reuse to come close to fully utilizing a MUD's capabilities without overloading it. While MUD systems were designed to be able to distinguish between the different users due to the unique features of each transmission, sophisticated high level techniques for feature extraction involving maximum likelihood joint estimation of all user's signals may not be implementable on handheld devices. This is because of the number of iterations required, the fact they must look at an entire data record; or that they require much more processing power than is available at the handheld device. Such computationally-intense algorithms include the M algorithm which is a search tree pruning algorithm that searches through only M possibilities, and the MMSE, Minimum Mean Squared Error algorithm. Thus, handheld devices may for instance not be capable of adequately implementing absolute maximum likelihood probabilities.

In summary, the handheld devices do not possess the required processing power or time luxury which in the present invention is handed by a relaxation of the timing constraints. Since for mobile ad-hoc networks the constraints need to be relaxed, some scheduling is required. Moreover, for maximum channel reuse the scheduling required is not the standard interference avoidance scheduling which prohibits transmissions if there is any possibility of inference throughout multiple hops of a network. Rather, what is required is intelligent scheduling which recognizes there are some situations in which links are permitted despite some level of interference in the network.

Note for MUD-enabled mobile ad-hoc networks in which multiple devices arrive on scene there is desirably no central processing device. There is no control node and there is no heterogeneous node where one node is more capable than another. Centralized controllers are avoided so there can be no central point of failure. Rather it is desirable that individual mobile devices act independently to do scheduling.

While some level of feature extraction is possible in mobile handsets, fully optimal joint detection of all user's features is not possible. The result is that scheduling must be utilized to avoid collisions between the ad-hoc network users when too much interference is present.

Standard scheduling such as carrier sense multiple access collision avoidance or CSMA/CA scheduling only permits one user per frequency. This scheduling unnecessarily limits the number of users that can operate on the ad-hoc network. Moreover, even though conventional ad-hoc networks suffer from hidden node or exposed node problems, for MUD-enabled ad-hoc networks, hidden nodes or exposed nodes present different interference problems.

In conventional non-MUD enabled ad-hoc networks, a hidden node occurs when a node is visible from a central node, but not from other nodes communicating with the central node. This leads to difficulties in media access control. Moreover, hidden nodes in a wireless network refer to nodes which are out of range of other nodes or a collection for nodes. Thus, the hidden node problem occurs when one user can talk to a node who also in one hop can talk to another node, but the two disparately spaced nodes cannot talk to each other. Thus, they cannot hear what the other node has said. As a result, scheduling decisions might be made that conflict considering that there may be a third node in the middle.

An exposed node occurs when a node is prevented from sending packets to other nodes due to a neighboring transmitter. For MUD-enabled ad-hoc networks, the exposed node problem is complicated by the fact that multiple nodes can be transmitting to multiple receiving nodes, some of which may be hidden from different nodes within the neighborhood. Thus, the scheduling to avoid wasted channel resources becomes more complex.

As a result, in scheduling it is very important to be able to identify hidden nodes and exposed nodes so as to avoid interference and maximize channel reuse. If one does not identify hidden nodes and exposed nodes, then a bad scheduling decision will be made. This is any decision that will result in unrecoverable data or wasted channel resources.

As noted above, prior systems have utilized interference avoidance paradigms such as carrier sense multiple access schedulers so that if any user hears that the channel is being used they are precluded from using it. Thus, these schedulers are single channel schedulers only usable where one has a single user on a single frequency.

Other interference avoidance scheduling methods use RTS CTS, Request to Send, Clear to Send messages. In these systems, a request is made to reserve the channel for a certain time period. When other users on the network hear that such a reservation is being made they know they cannot transmit.

However, utilizing these techniques does not relate to MUD systems which allow multiple users to use the same channel simultaneously. What is therefore needed is a technique that will enable scheduling that permits wider resource use such that ordinarily blocked transmissions are unblocked under certain circumstances to permit communications through ignoring traditional scheduling conflicts or by rescheduling.

By way of further background, most research in MUD technology to date has focused on physical layer challenges, with little attention being paid to design of an efficient MUD scheduler and the media access control (MAC) techniques required. MUD enabled MAC for mobile ad-hoc networks appeared in the literature only recently, with the main interest related to the "fairness" of medium access. This is described by K. Kusume, et. al, "Medium Access in Spread-Spectrum Ad-hoc Networks with Multiuser Detection," Eurasip Journal on Advances in Signal Processing, Vol. 2009; J. Zhang, et. al, "Multiuser Detection Based MAC Design for Ad-hoc Networks," IEEE Trans. On Wireless Communications, Vol. 8, No. 4, pp. 1836-1846, April 2009; and M. Bouharras, et. al, "Scheduling Optimization in Multiuser detection based MAC design for Networks," IEEE LCN, Montreal, Canada, October 2008. These techniques do not relate to resource allocation, or scheduling. Without effective scheduling, the MUD's potential cannot be fully realized.

In general, the application of scheduling schemes developed in the conventional interference avoidance paradigm is not straight forward when applied to MUD enabled networks. This is discussed in F. Borgonovo, et. al, "ADHOC MAC: a new, flexible and reliable MAC architecture for ad-hoc networks," IEEE WCNC, New Orleans, La., March 2003. Simply utilizing the above schemes in each attribute of the virtual channel may violate other requirements specific to multiuser detection.

It will be noted that the DARPA Interference Multiple Access (DIMA) communications program sought to develop a real-time prototype communication system that exploited MUD techniques to allow multiple simultaneous transmissions. Furthermore, the DIMA system was designed to operate in an ad-hoc fashion without requiring infrastructure or central controllers. Nor does the DIMA system rely on GPS. It was shown that the DIMA system can maintain a packet error rate (PER) of less than 1% as described by Y. Eisenberg, et. al, "MUD Enabled Media Access Control for High Capacity, Low-latency Spread Spectrum Communications," IEEE MILCOM, Orlando, Fla., October 2007 and R. Learned, et. al, "Interference Multiple Access Wireless Network Demonstration Enabled by Real-Time Multiuser Detection," IEEE Radio and Wireless Symposium, Orlando, Fla., January 2008.

SUMMARY OF THE INVENTION

A MUD-enabled ad-hoc network is provided with a scheduling system in which the schedules of all the nodes on the ad-hoc network are distributed around the network by use of a control message to indicate to all of the nodes the schedule that each node believes the network is using. Thus, each node has all the information it needs to do intelligent scheduling that maximizes MUD gain or channel reuse by using heretofore precluded channel access.

Specifically, control message information is utilized by the transceiver at each local node to schedule transmissions from the node to a destination node by picking available code slots from that maximize channel usage. This is done by a scheduling algorithm that ignores traditional interference avoidance scheduling, and rather ascertains usable code slots in which some interference occurs which would ordinarily preclude transmission. This is done by finding a usable set of code slots for the particular link.

The rules for scheduling specifically take into account the existence of hidden nodes and exposed nodes.

The subject scheduler therefore involves a cooperative MUD system in which each node independently schedules its transmissions based on cooperatively-shared scheduling information.

In order for the system to operate, each node first establishes a resource usage table to establish the schedule across the network as seen by the node's one hop neighbors. This table is populated from resource usage maps received from other nodes' control messages. Each node generates the resource usage map that is sent out in the control message from their compiled resource usage table. Clearly, both a node's resource usage map and resource usage table are initialized to assume all resources are free upon startup.

When populating the resource usage table, the local node labels slot codes as RX if the node receives on it and TX if the node transmits on it.

Secondly, it marks a slot code as BUSY if the node observes other transmissions on it. A code slot is labeled FREE if there are no transmissions being observed. Thus, the status of a slot code is reflected in the resource usage map by four states, namely FREE, RX, TX and BUSY.

When the local node desires to transmit to another node it calls the schedule to start the process of creating a reservation. The first step in setting up the reservation is for the node to identify the code slots available between itself and the intended destination node. For this, a series of rules are utilized to find an available resource, with these rules permitting scheduling of a transmission not only where no interference exists for the particular link, but also where interference may exist for some links.

To maximize channel reuse, a series of rules specifically tailored for MUD-enabled systems find available code slots that maximize the number of users on a MUD-enabled mobile ad-hoc network.

As noted above, in a suboptimal MUD system there is not enough compute power or time to separate out completely asynchronous signals to accommodate suboptimal MUDS. The subject ad-hoc MUD-enabled network permits maximum channel use by using a scheduling algorithm that under certain circumstances ignores "in use" or "busy" conditions identified by standard interference avoidance schedulers such as the carrier sense multiple access collision avoidance (CS-MACA) schedulers. This permits multiple users to transmit on a channel where transmission would ordinarily be limited to one user at a time, i.e. by blocking transmission to nodes labeled "in use" or "busy". As a result, the subject scheduling system increases throughput for these suboptimal MUD systems by in fact permitting transmission between certain nodes of the network previously labeled "in use" or "busy" where error-free transmission has been found to be possible.

The following are the rules in the picking of an available slot and code. Transmission is permitted if:
1. No 1-hop neighbors are receiving on the slot-code, thus to avoid collision;
2. The Destination node doesn't transmit in the slot, thus satisfying the half-duplex constraint at the receiver;
3. The Destination node doesn't receive on the slot-code, thus to avoid collision (note this is explicitly included in rule #1 as the destination must necessarily be a 1-hop neighbor);
4. The Destination node doesn't have the slot-code marked as "busy", which is to avoid collision;
5. A local node neither transmits nor receives in the slot, as only one transmission is possible per slot, thus satisfying the half-duplex constraint at the transmitter.

In short, a source node cannot select a slot-code already in use for transmission by any of the destination's 1-hop neighbors, or already in use for reception by any of the source's 1-hop neighbors (including the destination node); or the source node cannot select a slot which its destination node has already reserved for transmission.

To avoid collisions due to the hidden node problem, a source node cannot transmit on a slot code on which its destination node observes any transmission from anywhere and the source node's 1-hop neighbors are receiving from anywhere.

Thus, the present invention involves a MUD-enabled scheduling system for mobile ad-hoc networks that involves a distributed scheduling scheme. In particular, it has been discovered that the exposed node problem in MUD-enabled systems is quite different from those in conventional interference avoidance systems. It has also been found that the exposed node problem in MUD-enabled scheduling is more complicated because no single solution achieves maximum channel reuse in different network topologies and different link patterns.

In summary, a scheduling system is devised for a MUD-enabled mobile ad-hoc network that maximizes channel reuse by providing the transceivers at each node with an independent scheduler that, knowing the state of all the nodes on the network, finds acceptable code slots that result in error-free data receipt for multiple simultaneously transmitting users.

BRIEF DESCRIPTION OF THE DRAWINGS

These and other features of the subject invention will be better understood in connection with the Detailed Description, in conjunction with the Drawings, of which.

DETAILED DESCRIPTION

Figure 1:
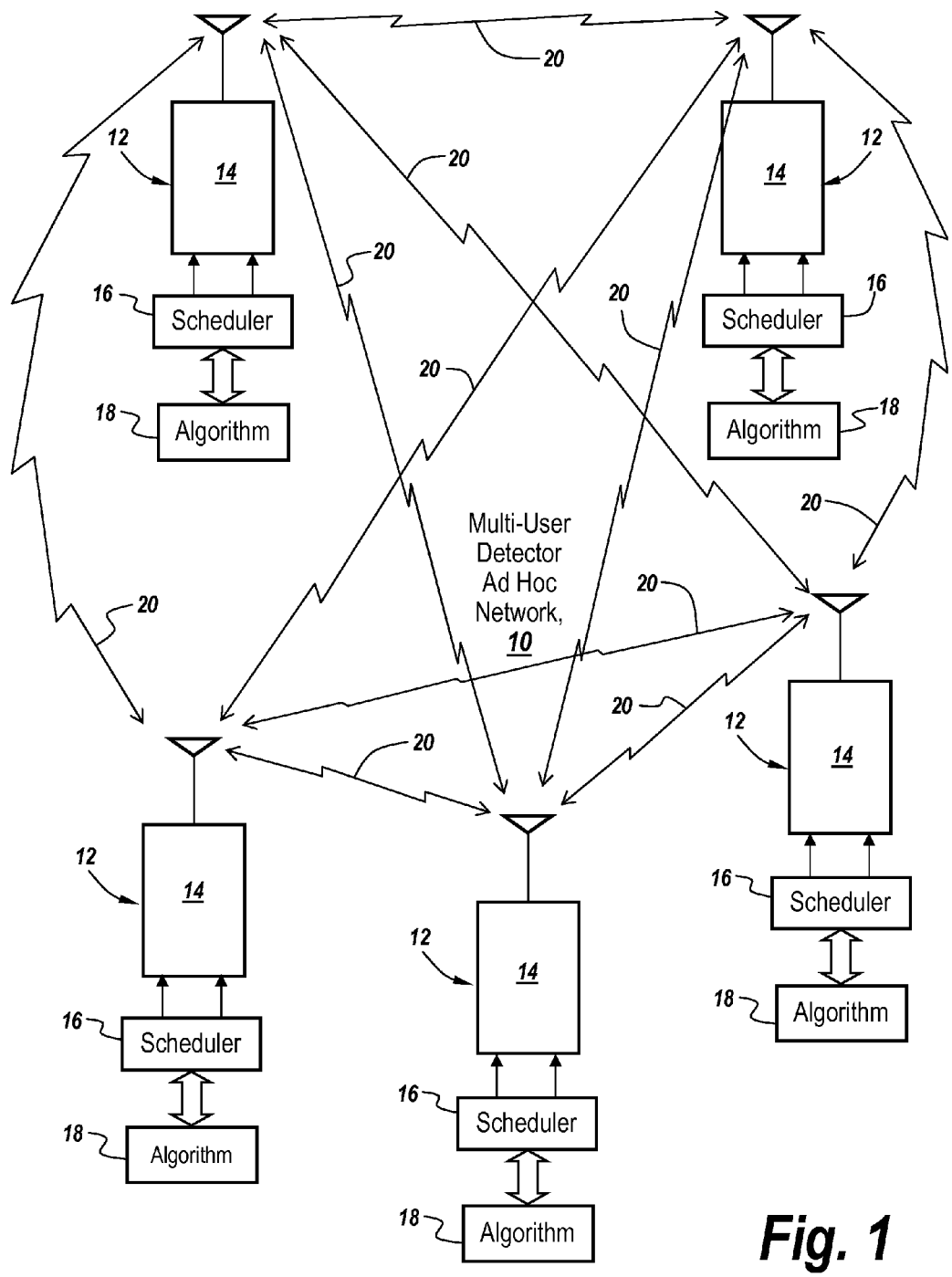
FIG. 1 is a diagrammatic illustration of a MUD-enabled mobile ad-hoc network involving nodes that individually schedule transmissions.

Referring now to FIG. 1, a multiuser detector enabled mobile ad-hoc network 10 is comprised of a number of nodes 12 at which a corresponding number of transceivers 14 are located. Each of the transceivers has coupled to it a scheduling module 16 under the control of an algorithm 18 that provides scheduling for transmission between a local node, namely the node that seeks to be a source node, and a recipient or destination node.

It is the purpose of the subject invention to provide scheduling for transmissions from one node to another so as to avoid conflict while at the same time using maximal use of MUD features.

It will be appreciated that each of the nodes has a transceiver which operates independently to schedule its own transmissions having received a control message from each of the other nodes on a control channel generally indicated by reference character 20.

What will be seen is rather than utilizing centralized control for the scheduling of transmissions between nodes, in the subject system information on the control channel is utilized to enable each individual scheduler to make its own decision as to how to schedule the transmission from its own node.

Figure 2:
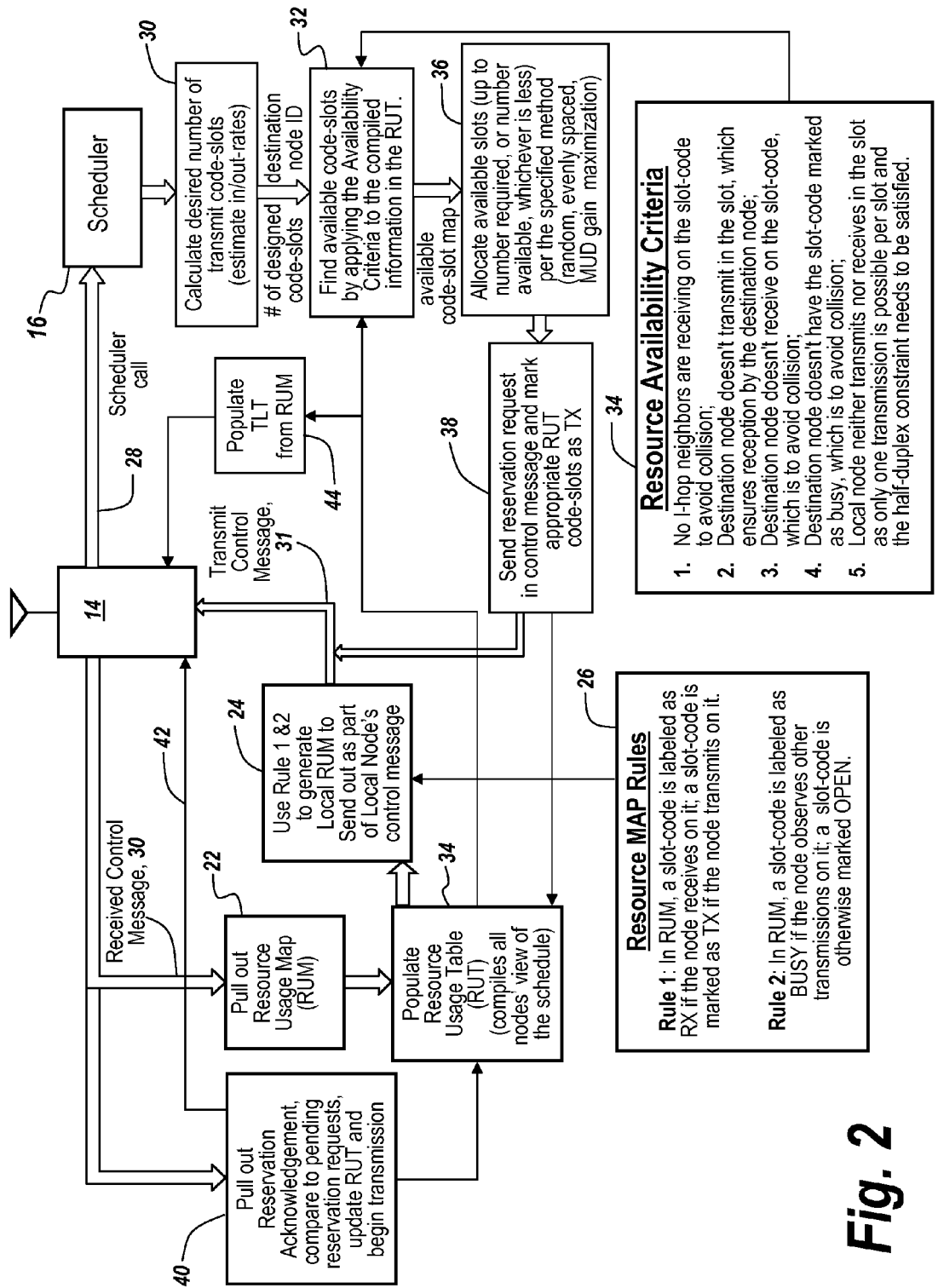
FIG. 2 is a diagrammatic illustration of the operation of the scheduler at one of nodes of FIG. 1.

How this is accomplished is now described in terms of FIG. 2. The first thing that needs to be accomplished is to populate a resource usage map. This resource usage map is here indicated at 22 and doing an initialization has no entries in it. In order to provide entries and as illustrated at 24, the system uses Rules 1 and 2 which are the resource map rules to generate a local resource usage map or RUM, and sends out the information in this local resource usage map as part of the local nodes' control message.

By local node is meant the node at which the scheduler is called to do the action requested.

As to the resource map rules illustrated at 26, Rule 1 states that in the RUM a slot code is labeled as RX if the node receives on it, and a slot code is marked TX if the node transmits on it.

Thus, if the local node is transmitting on any given slot it marks it as TX. If it is receiving on any given slot it marks it as RX.

As to the second Rule, if the local node hears other transmissions that it is not the source of or destination of it marks it as BUSY. If this local node hears nothing and expects to do nothing then it marks its own local node as OPEN or FREE.

The result of this action is that the local node generates a local resource usage map or RUM to send out as part of the local nodes' control message.

The local node through its transceiver then transmits a control message about its own characteristics. As other nodes within the local node's 1-hop neighbor hood generate and transmit their resource usage maps, the local node receives them at 30, pulls out the resource usage map 22 and stores this information within the local node's resource usage table. In this way, the local node has its view of the schedule across the portion of the network that it can affect.

If a node wants to transmit from the local node to a destination node it invokes scheduler 16 by providing a scheduler call message 28 to the scheduler.

The scheduler performs the following task. First, as illustrated at 30, it calculates the desired number of transmit code slots by estimating in and out rates. Thus it calculates the number of slot codes that are required given how many packets it has for the destination node. This means that it must know how many packets it is seeking to send out, both the in rate (how fast packets are coming into the MAC destined for the destination node) and out rate (how many packets the local node has successfully sent to the destination node in previous frames), and then calculate the number of desired slots to transmit on.

Having decided the number of code slots and the destination node's node ID it finds available code slots as illustrated at 32 by applying the availability criteria listed at 34. The available code slots are output to a code slot allocation process illustrated at 36 which allocates available slots up to the number required or the number available, whichever is less, using a specified method, either random code slot selection, evenly spaced selection, and/or a MUD gain maximization selection.

Note if there are not enough slots available it will assign as many as it can, whereas if there are more than enough slots it will select a specific number depending on the method that it is configured to use whether for instance it is randomly selecting them, evenly spacing them, or doing one of those while giving preference to slots where the destination node is already receiving on less than the maximum number of codes for MUD gain maximization.

After the available slots have been allocated the system sends a reservation request as illustrated at 38 which is transmitted in the control message and marks the appropriate research usage table code slots as TX.

When the control messages are sent to the destination node, if the destination node sees it is available to receive on the requested slot-codes it will respond in a control message with a reservation acknowledgment such as illustrated at 40. The reservation acknowledgement goes back to the local node where transceiver 14 is activated to transmit to the destination node by a signal along line 42. The transceiver upon actuation looks to a Transition Look-up Table, TLT 44 that specifies what the transceiver is to do in each Data Zone based on the schedule from the scheduler, with TLT 44 having been populated from the Resource Usage Table, RUT 34. Thus the local node that originates the request will hear an acknowledgement back indicating that the destination node is acknowledging the local node, with the receipt of the reservation acknowledgment starting the transmission at the schedule slot or slots. With the resource usage table populated by pulling out the resource usage map, all of the information that the scheduler needs is available at the local node, whereby the scheduler in applying the resource availability criteria schedules traffic in an optimal way for maximal MUD channel reuse given the fact that there will be available code slots that might otherwise marked as being "busy" or "in use", but rather can be utilized if the resource availability criteria are met.

I. MAC

Figure 3:
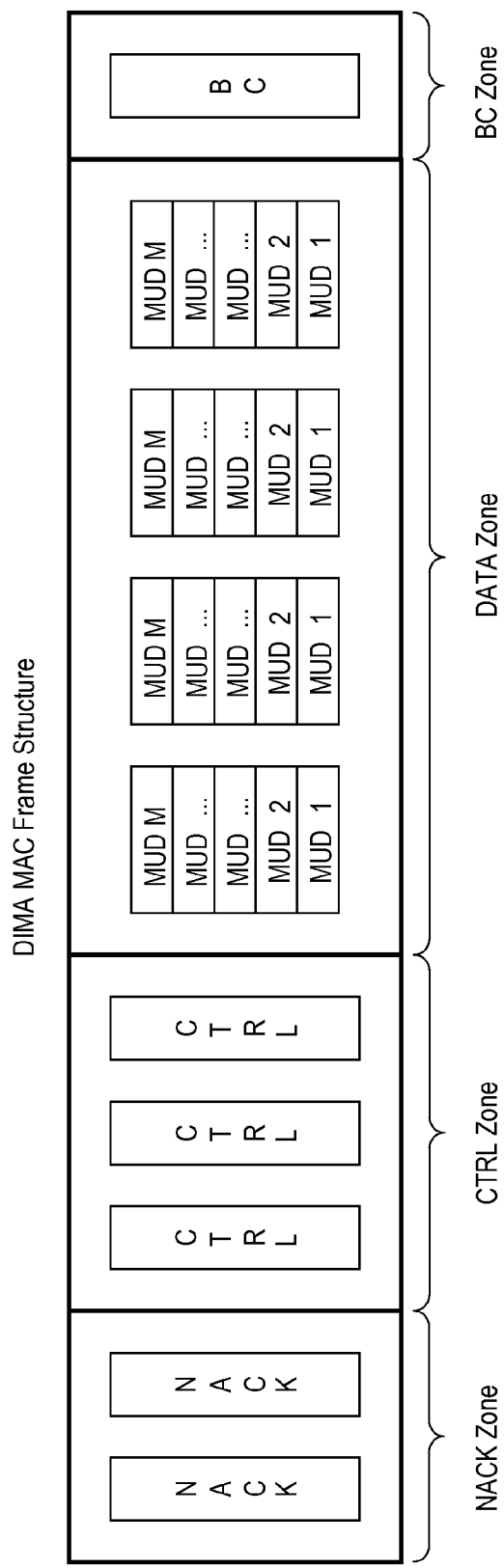
FIG. 3 is a schematic drawing showing a MAC frame structure in a preferred embodiment of the present invention.

Referring to FIG. 3, what is shown is one example of a MAC framework structure that represents different types of messages transmitted on the channel. The messages that are important to the subject invention occur in the Control Zone and the Data Zone and relates to the messages that the transceivers generate. These messages include RUM information, reservation requests, and acknowledgements. These messages happen within the Control Zone in given control slots. The Data Zone shows the MUD packets in which for example there are four slots and M codes. This then corresponds to a code slot map reflecting the number of codes and number of slots.

It is noted that scheduling is a core function module in the MAC. In order to better understand the subject Scheduling and to make the application self contained, a brief description of the MAC is presented in this section.

The MAC takes a TDMA based approach to cover some key requirements presented by MUD and applications, i.e., synchronization, network capacity, QoS, etc. The underlying design philosophy is that data, based on their functionalities in the MAC layer of wireless networks, generally fall into three categories: network entry, network management and data traffic.

The MAC is structured to utilize different approaches to process these data for achieving high efficiency and low latency. By using different protocols for different message types, the inherent weaknesses of a given protocol are masked. Overhead is carefully controlled so that channel efficiency and network performance is not heavily affected by MAC protocol overhead.

In order to better service different types of data while focusing on challenging issues not covered in other systems, the MAC frame structure consists of four logical portions: NACK Zone, CTRL Zone, DATA Zone and BC Zone. Each zone contains certain number of slots, as shown in FIG. 3. In order to reduce latency, the four portions can be physically intermingled and evenly districted in a frame. Each zone uses a different access scheme as is disclosed in Mo, et. al, "Multiuser Detection Enabled Medium Access Control in Mobile Ad-hoc Networks," submitted to IEEE MILCOM 2010, the contents of which are incorporated herein by reference.

The NACK Zone handles negative acknowledgment (NACK) messages. Different from acknowledgment, NACK is generated only when DATA packets are not correctly received. This makes NACK occurrence random and dependent on packet error rate (PER). Because the physical layer achieves very low packet error rate, the NACK rate is controlled to be at quite low level as is disclosed in, J. Tranquilli, et. al, "Real Time Results and the Application of a Multiuser Detection Enabled Mobile Network," submitted to IEEE MILCOM 2010, the contents of which are incorporated herein by reference. As such, a simple carrier sense multiple access (CSMA) scheme, such as CSMA/CA or slotted Aloha, is adopted in this zone.

The CTRL Zone handles MAC layer control messages including resource allocation negotiation. This type of message is characterized by its broadcast nature, relatively short duration, and low frequency of occurrence. Fairness of transmission among nodes is required. To resolve contention from 1-hop neighbor nodes and avoid collision from 2-hop hidden nodes, this portion uses distributed scheduling scheme. Particular in the MAC design, node activated medium access (NAMA) scheduling is utilized as an access scheme for the CTRL Zone as is disclosed in L. Bao, et. al, "Distributed Channel Access Scheduling for Ad-hoc Networks," book chapter in "Algorithms and Protocols for Wireless and Mobile Networks", Edit. A. Boukerche, Publishers: CRC/Hall Publisher, 2004; and L. Bao, et. al, "Distributed Dynamic Channel Access Scheduling for Ad-hoc Networks", In JPDC, Special Issue on Wireless and Mobile Ad-hoc Networking and Computing, 2002, the contents of which are incorporated herein by reference. NAMA is a TDMA protocol that uses a deterministic hash function to determine which node should be given the opportunity of transmitting during a given slot.

The DATA Zone utilizes MUD capability to handle application data, typically high volume streaming data such as multimedia streaming, voice, high rate data streams Usually this type of data is transmitted in unicast or multicast mode and has long durations. Bandwidth needs for this type of data and Quality of Service (QoS) requirement on throughput and latency are often presented and could be varying among applications. A sophisticated scheduling scheme is applied to deliver this type of data so that different Quality of Service requirements are satisfied. Moreover, a good resource allocation can not only prevent contention and collision caused by hidden nodes, but also can take into account of exposed nodes so that a maximum channel reuse can be achieved.

The BC Zone is designed to distribute network management messages such as topology control, routing creation and maintenance.

In order to amortize the cost of reservation negotiations, reservations are made for a relatively long period of time so that gains in performance easily outweigh cost associated with reservation establishment. To prevent packet loss caused by packet collisions and guarantee a reliable delivery of reservation negotiation packets, both resource reservation request and acknowledgment are sent in the CTRL Zone. Due to the usage of a hash function to determine transmission of reservation negotiation, reservation negotiation may not necessarily occur in two consecutive slots. Instead the interval between reservation request and reply might be large. The impact of this on latency and reservation conflict is considered in the Scheduling design.

II. Scheduling

QoS is a critical aspect of network service in many military and commercial systems. It is a well known fact that QoS guaranteed service for traffic data with long duration can be easily provided by reservation based scheduling. In addition, reservation based scheduling can easily beat any contention based scheduling in achieving high channel efficiency. Due to the above reasons, reservation based scheduling is adopted for data transmission in the DATA Zone. The Scheduler includes following major functions:

packet in-rate estimation
finding available resource
resource allocation
detection of reservation conflict
resolution to reservation conflict.

A. Packet in-Rate Estimation

Packet in-rate estimation is designed to convert packet queue length and its QoS requirement into requested amount of resource. In the subject system, the QoS requirement is represented by traffic type and desired latency, and requested resource is given in the number of slots. If the already-allocated resource is less than that requested, more resource will be reserved. On the other hand, if the allocated resource is more than that requested, the extra portion is released. Release of reservations is handed by having the source node remove the appropriate transmit entries from its resource usage table. In this way, when it generates a resource usage map to send to other nodes, the released slots will show us as FREE. The destination (and other 1-hop neighbors) will recognize this change when they receive the RUM and update their tables appropriately.

The MAC also supports multiple queues, one queue being created to hold data coming from/going to one different neighbor node. In the presence of multiple queues, a priority order is determined for service. Many factors can be taken into account in selection criteria to meet different QoS requirement, i.e., highest priority, longest queue length, highest in-rate, longest waiting time, or largest score of weighted combination of above factors.

B. Resource Usage Status

Based on description of the MAC, in one embodiment as reflected in the DATA Zone, traffic data is transmitted in slots, with five codes in each slot. Thus resources in the DATA Zone are defined in units of slot-code.

In distributed scheduling, a node relies on channel utilization status of its own and its neighborhood to make decisions on resource allocation. In order to disseminate channel states to neighbors, a Resource Usage Map (RUM) is constructed by each node and is broadcasted periodically in the CTRL Zone. When receiving other nodes' RUMs, a node inserts the received RUMs into a local table called Resource Usage Table (RUT). The RUT will be used in searching for available slot-codes.

The scheduler takes into account hardware constraints, such as half-duplex and the capability of the MUD radio to transmit on a single code per slot. In observing the above conditions, a source node cannot select a slot already in use for either transmission or reception; or selects a slot in which its destination node already reserves for transmission. In order to propagate the above two states, slot-code states shall include transmission (TX) and reception (RX).

Rule 1: In the RUM, a slot-code is labeled as RX if the node receives on it; a slot-code is marked as TX if the node transmits on it.

The scheduler resolves generic issues in mobile ad-hoc networks, i.e., the hidden nodes and the exposed nodes problem in each dimension of the slot-code. The hidden nodes problem occurs in two cases: 1) when a source node transmits to its destination node on slot-codes on which the destination node receives or hears other transmissions; or 2) when a source node transmits on slot-codes on which its non-destination neighbors are receiving. To avoid the hidden nodes problem, a node cannot transmit on slot-codes on which its destination node observes transmission and its 1-hop neighbors are receiving.

Rule 2: In the RUM, a slot-code is labeled as BUSY if the node observes other transmissions on it; a slot-code is otherwise marked as FREE or OPEN;

Based on above discussion, it is easy to understand that four states are needed to describe status of a slot-code, i.e.

FREE—no transmission is observed;
TX—sender node transmits;
RX—sender node receives;
BUSY—sender node observes transmission (one or multiple).

C. Signature Maintenance

As has been mentioned, a MUD receiver is able to distinguish multiple transmitted signals in a slot. To perform the separation, most MUD algorithms, i.e., recursive lease square (RLS) and minimum mean square error (MMSE), require 1) knowledge of transmitter's ID and code associated with each transmitted signal, and 2) no multiple signals on one code. Given these requirements, it is obvious that the node ID together with the code constitutes a unique identity for a transmitted signal. For easy communication, this identity will be called signature. A MUD transmitter uses a signature for data transmission. A MUD receives uses the signature to separate simultaneously transmitted signals.

A table called the Transition Look-up Table (TLT) is created by each node to store information that indicates actions in each slot of the DATA Zone along with the signature information to execute the action. If transmitting, the Transition Look-up Table gives the destination node and code used for the transmission. If receiving, the Transition Look-up Table provides source node IDs and their transmission codes, and non-source neighbor nodes and their transmission codes. In one embodiment, the Transition Look-up Table has a structure of

```
typedef structure TLT
{
    int     slotState[MaxSlot];
    int     dest[MaxSlot];
    int     code[MaxSlot];
```

```
        int     source[MaxSlot*MaxCode];
        int     txNode[MaxSlot*MaxCode];
}
```

'slotState' indicates the state of each slot, such as TX, RX, IDLE, etc.

'dest' gives destination node ID in the slot if the local node transmits in the slot.

'code' provides code on which the local node uses in transmission.

'source' contains source node ID that transmits on a slot-code and the local node is the destination of this transmission.

'txNode' includes all neighbor nodes that transmit on a slot-code no matter the local node receives the transmission or not.

'MaxSlot' denotes the total MUD slots in a frame.

'MaxCode' denotes the total codes used in one MUD slot.

Difference between 'source' and 'txNode' is that the former contains only the source nodes which the local node is interested in receiving from, while 'txNode' includes all neighbor nodes that transmit in the slot. 'Dest', 'code' and 'source' are determined as a result of scheduling negotiation. 'txNode' is derived from the RUT.

D. Finding Available Resource

After a node has determined how many slots are needed as a result of packet in-rate estimation, the node applies the following criteria to find an available resource set:
1. No 1-hop neighbors are receiving on the slot-code to avoid collision;
2. Destination node doesn't transmit in the slot, which ensures reception by the destination node;
3. Destination node doesn't receive on the slot-code, which is to avoid collision;
4. Destination node doesn't hear any transmission on the slot-code, which is to avoid collision;
5. Local node neither transmits nor receives in the slot due to half duplex radio used by the local node and single code transmission per slot.

The above criteria can be satisfied by following steps to find out available slot-codes.
1) Get 1-hop neighbors' receiving slot-codes, or RxCode, from each neighbors' RUM, including the destination node,
   H1R(i)=Neighbor(i).RxCode;
2) Get summation of 1-hop neighbors' receiving slot-codes, from step 1),
   H1RxCode=ΣH1R(i),
   where summation is 'bit or' operation;
3) Get unavailable slot-codes of destination, UCode, from destination's RUM,
   RxU=Dst.UCode;
4) Get destination's transmission slots,
   RxT=Dst.TxSlot;
5) Get local node's reception slots,
   TxR=Src.RxSlot;
6) Get local node's transmission slot, (the local node can only transmit on one code in a slot, hence already used slots cannot be reused),
   TxT=Src.TxSlot;
7) Get available slots (half duplex compliant),
   AvailableSlots=Invert(RxT+TxR+TxT);
8) Get available codes,
   AvailableCodes=Invert(H1RxCode+RxU);
9) Get destination's reception slots,
   RxR=Dst.RxSlot;
10) Choose slot-codes from AvailableSlot and AvailableCode until
    getting requested number of slot-codes or,
    no available slot-codes.
1)-4) can be derived from neighbor nodes' RUMs, i.e.,
    Slot-codes on which the neighbor nodes, including destination, are receiving;
    Slot-codes on which the destination can hear, but not receive;
    Slot-codes on which the destination is transmitting.
5) and 6) can be obtained from TLT, i.e.,
    Slots in which the local node is transmitting;
    Slots in which the local node is receiving.

E. Resource Allocation

Once the available slot-codes set is determined, the scheduling decides which slot-codes are taken in order to provide unique features to meet different QoS requirements. Many options can be considered.

The two simplest ways to choose slot-codes in the available slot-codes pool are the lower index first and random picking.

In order to fully utilize the MUD capability of the destination node, the source node should first consider those slots in which the destination node is receiving. If there are available codes in those slots, the source node tries to use these slots first. Only when there are no available codes in these slots, the source node checks other slots. Doing this leaves the destination node as many unused slots as possible so that the destination node can use them for transmission in the future. At the same time, the number of simultaneous transmissions in a slot is maximized, which results in high spectral efficiency.

In addition to bandwidth, many multimedia applications have strict requirement on latency and latency jitter. Even-spacing slot allocation offers less latency jitter and thus is desirable. However an exact even-spacing allocation is very hard to manage and maintain in a dynamic environment where incremental addition of slots and decremental release of slots occur frequently. A simple scheme is adopted that distributes allocated slots over the frame in pseudo even fashion and is quite simple to manage. If the frame consists of MaxSlot slots and requested bandwidth is B slots, the frame is divided into N groups:

$$N = \left\lceil \frac{MaxSlot}{B} \right\rceil \quad (1)$$

When making a reservation, the group with the least reserved slots for an interested destination is considered first. When releasing slots, the group with most reserved slots is considered first. If multiple groups have the same number of the most reserved slots or the least reserved slots, the scheduler chooses one either in an ordered manner or randomly. Inside a group, slots can be selected in the order of slot number or randomly.

The scheduler also considers MUD specific restrictions such as the near-far issues. A power aware scheduling scheme is developed that allocates resources in a way to skip the slots that experience severe near-far problem. Details of the power aware scheduling design can be found in J. Farkas, et. al, "Power Aware Scheduling for Multiuser Detection Enabled MANET," submitted to IEEE MILCOM 2010, the contents of which are incorporated herein by reference.

F. The Exposed Nodes Problem in MUD

Figure 4:
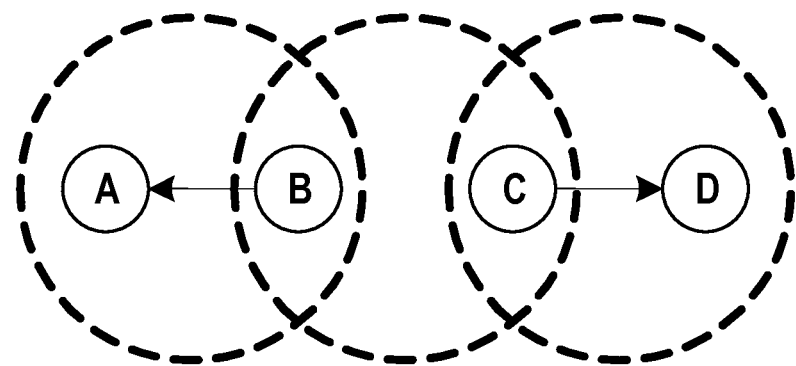
FIG. 4 is a schematic drawing showing conventional exposed node problems in a preferred embodiment of the present invention.

Recall the resolution to the exposed node problems in conventional interference avoidance systems where multiple transmissions are allowed in a slot to achieve maximum channel reuse as long as neighbor nodes do not receive in the slot. This can be explained in the example in FIG. 4. In the figure, dashed circle indicates radio reception range. Simultaneous transmissions from node B to A and from C to D are allowed because A cannot hear C and D cannot hear B.

Thus, attention has to be paid to the exposed nodes problem in MUD networks. In MUD networks, a node receives a mixture of multiple transmissions of signals. Each signal acts as an interferer to other signals. In order to separate multiple signals, signature is needed in MUD receivers. Failure to separate a signal in a slot leaves the signal in the mixture of multiple signals, which reduces signal to interference and noise ratio (SINR) for other signals in the slot, and as a consequence impacts demodulation of other signals in the slot.

Figure 5:
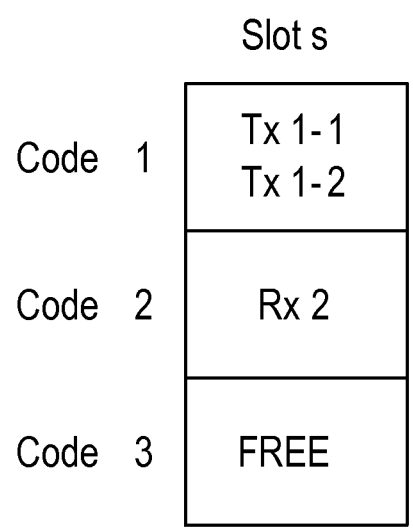
FIG. 5 is a schematic drawing showing exposed nodes problem in MUD in a preferred embodiment of the present invention.

An example is given in FIG. 5 to illustrate this problem.

FIG. 5 illustrates the exposed node problem. For instance, if a receiver when trying to receive in Slot 5 and on Code 2, Slot 5 is labeled RX2. However, if there is a Code 2 transmission and a code 1 transmission in slot 5, there would be interference that would make Code 2 undecodable.

Thus in FIG. 5, a node intends to receive a signal on Code 2 in Slot S while it also observes two transmissions on Code 1 in the slot. Due to the sharing of the same code by Tx1-1 and Tx1-2, the node is unable to separate Tx1-1 and Tx1-2. These two signals impose interference to signal Rx2, and may make the Rx2 undecodable.

To prevent multiple transmissions on a single slot-code, it is required that (a) a node can transmit on a slot-code on which its 1-hop neighbors only observe transmission on the slot-code but do not receive on any code in the slot. (b) If its 1-hop neighbors receive on some codes in a slot, no multiple transmissions are allowed in any codes in the slot.

Figure 6:
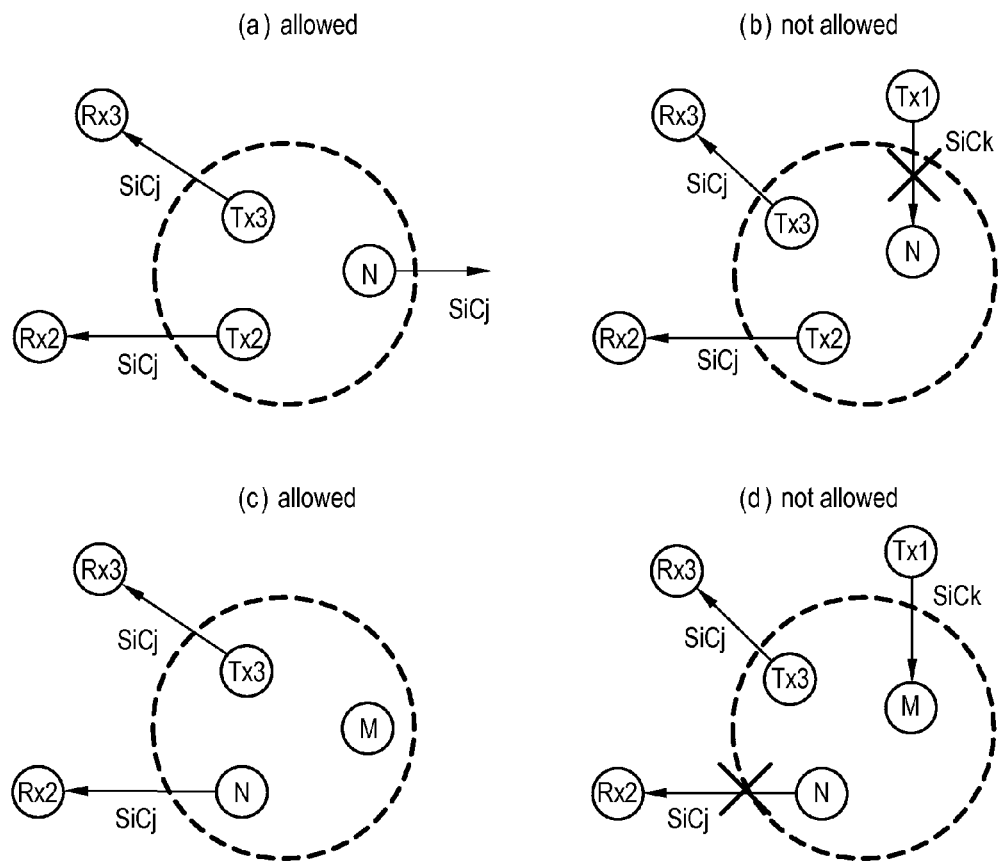
FIG. 6 is a schematic drawing including panels a thru d showing resolution to the exposed node problems in a MUD-enabled mobile ad-hoc network.

Some examples are given in FIG. 6 to show transmissions that are and are not allowed to illustrate the above statements. In FIG. 6, the dashed circle indicates radio reception range, and all nodes outside the circle cannot sense each other. In panel (a) there is an allowed case. Here multiple nodes, Tx2 and Tx3, are transmitting on one slot-code, Slot Si and code Cj. This slot-code can still be used by node N for transmission because neither of N's neighbors, Tx2 and Tx3, receives on SiCj.

In panel (b) there is a disallowed case. Here there are multiple nodes Tx2 and Tx3 transmitting on one slot-code SiCj. This slot cannot be used by node N to receive even though node N receives on SiCk instead of on SiCj because it violates requirement (b) which makes node N unable to filter out the two transmissions on SiCj. This is because N is hearing multiple transmissions on one slot code Therefore it needs to deny the transmission from TX, even though the transmission is on a different code.

In panel (c) which is an allowed case, node Tx3 transmits in slot Si on code Cj. Note the fact that while node M doesn't receive in slot Si although it hears SiCj used by Tx3 does not affect node N. Node N can therefore transmit on slot-code SiCj.

In panel (d) where node M receive on SiCk and hears another slot-code SiCj used by Tx3, node N cannot transmit on SiCj because its transmission will make M see two transmissions on SiCj which reduces M's ability of receiving on SiCk.

From above description, it can be seen that when considering a slot-code for reservation, a node needs to make sure the all following conditions are satisfied.

The destination node claims the slot-code is 'FREE'.
The destination node does not observe multiple transmissions on any code in the slot;
If its neighbors receive on other codes in the slot, they do not hear any transmission on the code.

In order for the destination node to notify the source node of multiple transmissions on a slot-code, another state is needed that distinguishes single transmission (S_TX) from multiple transmissions (M_TX). Comparing with the original 2-bit scheme to represent 4 states (TX/RX/BUSY/FREE), a 3-bit scheme is demanded in order to represent 5 states (S_TX/M_TX/RX/BUSY/FREE), which leads to an overhead increase by 50%.

By adding the following two operations to the creation of RUMs, it is possible to use the original 4 channel states to resolve the exposed nodes problem in MUD networks.

Rule 3: If a neighbor node (N) receives in slot Si (on any codes), transmission heard by N on all codes Cj in Si are treated as RX by the local node before applying the algorithm to search for available slot-code sets. Resolution to the hidden nodes problem, or avoiding transmission where its neighbors receive, prevents the local node from selecting Cj for transmission, but allows the local node to use other codes in the slot for transmission.

Rule 4: If the local node sees multiple transmissions in the same slot-code SiCj, the local node marks all codes in Si as BUSY in its RUM and the modified RUM is transmitted. This process converts the situation into the hidden nodes issue. Applying resolution to the hidden nodes problem, the local node's neighbors will not transmit in slot Si to the local node.

The same examples in FIG. 5 are used herein again to illustrate how Rule 3 and Rile 4 work. In the panel (a) where both Tx2 and Tx3 transmit on SiCj, both nodes mark SiCj=TX (as normal). Node N can still take SiCj for transmission. In the panel (b) where both Tx2 and Tx3 transmit on SiCj, both nodes mark SiCj=TX (as normal). Node N marks all codes in Si as BUSY (Rule 4), which prevents Tx1 transmitting to node N in Si on any codes. In the panel (c) where Tx3 already transmits on SiCj and M marks SiCj as BUSY (as normal). Node N can still transmit on SiCj. In the panel (d) where Tx3 already transmits on SiCj and M receives on SiCk, and M can hear Tx3. Then M marks SiCj as BUSY. When making resource allocation, node N changes M's SiCj into 'Rx' (Rule 3), which prevents node N from transmitting on SiCj.

Although above solution can increase channel reuse in the given scenario, it may reduce channel utilization in other scenario. If node N, in FIG. 9, selects the same slot-code (SiC1) used by Tx for transmission, all other nodes in the cluster cannot use other codes in the slot for receiving because of their observation of multiple transmissions on SiC1.

G. Schedule Conflict and Resolution

Schedule conflict refers schedules that violate the aforementioned Rules and results in failure of reception by destination nodes. Although scheduler intends to avoid collision when it is launched, communications within wireless MANETs may still frequently suffers from schedule conflict, a certain effect caused by channel reuse and nodes' mobility.

Schedule conflict is detectable if all nodes broadcast channel state around them and compare their local TLT and their neighbors' RUMs. Any violation of the aforementioned Rules indicates schedule conflict. Upon discovery of any schedule conflict, the node shall release the affected slot-codes and allocate a new resource.

Figure 8:
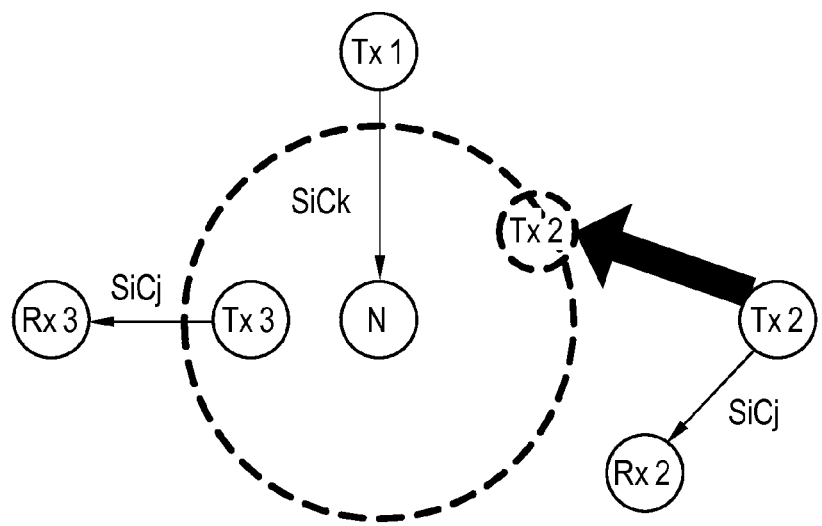
FIG. 8 is a schematic drawing showing schedule conflict in a preferred embodiment of the present invention.

However schedule conflict caused by the exposed node problem can be identified only by affected receiver nodes. For example in FIG. 8 where Tx2 and Tx3 are transmitting on slot-code SiCj, N are receiving on SiCk, and Tx2 is outside the reception range of both Tx3 and N. When Tx2 moves into the reception range of node N but still outside Tx3's reception range, neither Tx2 nor Tx3 can find each other just from node N's SiCj='BUSY' because both Tx2 and Tx3 are transmitting on SiCj. In this case, only node N can figure out that they both transmit on the same slot-code. Even when node N ceases receiving on SiCk, Tx2 and Tx3 still cannot find out about each other. In a design that does not allow multiple transmissions on a slot-code, a simple solution to fix the problem is that node N marks SiCj as 'RX', which informs Tx2 and Tx3 that they are transmitting on a slot-code used by a non-destination node, indicating a reservation conflict. Then Tx2 and Tx3 releases this slot-code and try to find other resource.

Figure 7:
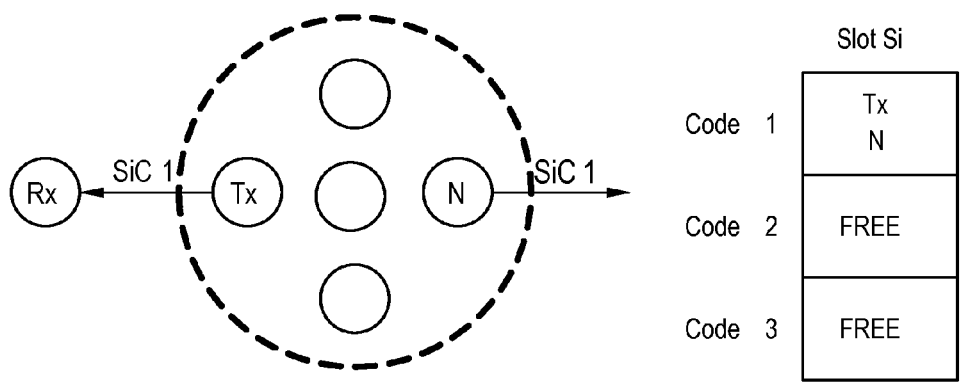
FIG. 7 is a schematic drawing showing the exposed nodes problem as it relates to resource allocation in a preferred embodiment of the present invention.

From above discussion, it can be seen that the exposed node problem in MUD-enabled systems is quite different from those in conventional interference avoidance systems. In some cases, as described in FIGS. 6-(a) and 6-(c), permitting multiple transmissions on a single slot-code may lead to a better channel reuse. In other cases as depicted in FIG. 7, forbidding multiple transmissions on one slot-code may result in a higher channel reuse. The above examples indicate that no single solution can achieve maximum channel reuse in all different network topologies and link patterns.

H. Resource Release

A resource is released in many conditions, such as a finished application, detection of a reservation conflict, or one party of a communication link moves away.

Due to the use of the RUM, an implicit resource release is adopted to reduce protocol overhead. Both source nodes and destination nodes can initiate resource release. If a source node releases resource, it modifies the corresponding slot-codes in the RUM from 'TX' to any of the other states. Finding the source node no longer transmits on the reserved slot-codes, the destination node releases the resource too. The procedure is similar for the destination node to start resource release.

III. Experiment Results

To evaluate functionality and performance of the scheduler, extensive simulation have been conducted before the scheduler has been prototyped and demonstrated in laboratory environment and field trial. Some simulation results are presented in this application. For easy comprehension, all results are converted from log format into pictures. Results of the field trial of the subject system can be found in J. Tranquilli, et. al, "Real Time Results and the Application of a Multiuser Detection Enabled Mobile Network," submitted to IEEE MILCOM 2010, the contents of which are incorporated herein by reference.

In all simulations, reservation covers 6 slots and 3 codes in each slot. In simulation 1, node 1 allocates 2 slots for transmission to node 2, then node 2 reserves 2 slots for transmission to node 3, and finally node 3 selects 2 slots for transmission to node 1. Evan-space allocation is used, which generates results shown in FIG. 7.

Simulation 2 tests hub-and-spoke in which node 2, 3 and 4 taking turns making reservation of 2 slots for transmission to node 1. Slot-codes are randomly selected. Results, as displayed in FIG. 8, indicates that although random selection is configured, schedulers in node 3 and 4 still pick the slots chosen by node 2, so that maximum spectral efficiency is achieved. At the same time, the allocation leaves 3 unused slots that can be used by node 1 for transmission.

Figure 9:
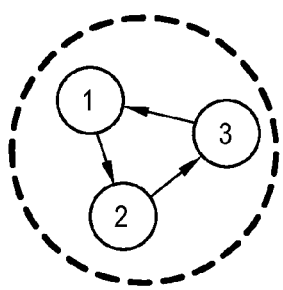
FIG. 9 is a schematic drawing showing a first simulation setting and results in a preferred embodiment of the present invention.

Simulation 3, depicted in FIG. 9, demonstrates exposed nodes setting in MUD systems. Node 1, 2 and 3 are in radio reception range; node 4, 5 and 6 cannot hear each other, but are in the neighborhood of node 2, 3 and 1 respectively. Multiple transmissions are allowed on a single slot-code and, in order to create such scenario, slot-codes are selected in sequential order. First node 2 requests 2 slots for transmission to node 4; then node 3 reserves 3 slots to node 5. These two reservations lead to such a channel usage as provided in the figure, which exhibits multiple transmissions on (slot 1, code 1) and (slot 2, code 1). Observing multiple transmissions in slot 1 and 2, node 1 marks all codes in both slots as 'BUSY' by following Rule 4. Now as node 6 allocates 4 slot-codes to node 1, slots 1 and 2 are treated as unavailable although there are still unused codes in these two slots.

Figure 10:
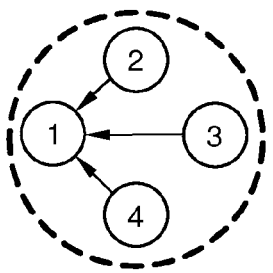
FIG. 10 is a schematic drawing showing a second simulation and results in a preferred embodiment of the present invention.
Figure 11:
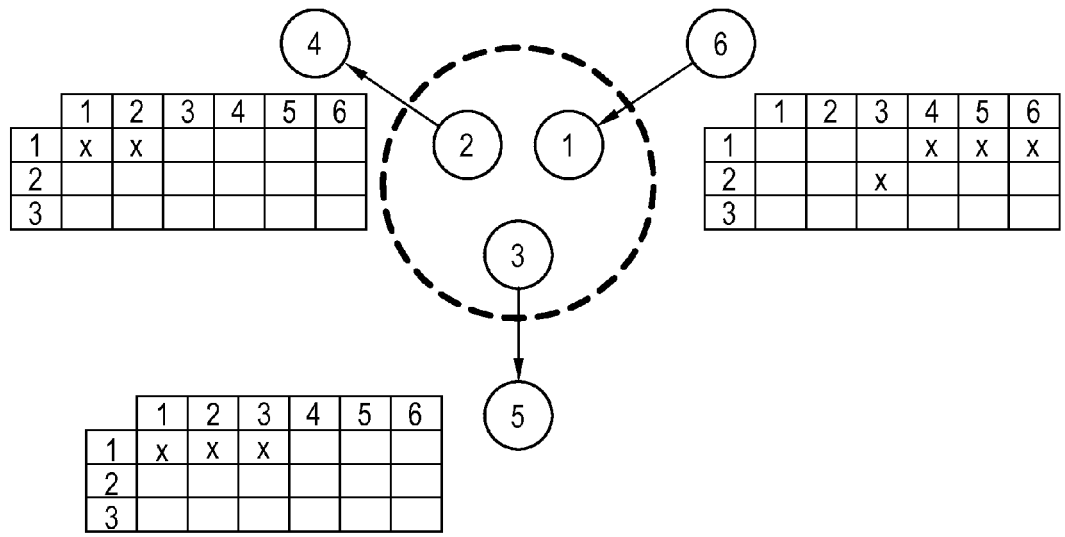
FIG. 11 is a schematic drawing showing exposed node processing for a third simulation in a preferred embodiment of the present invention; and, FIG. 12 is a schematic drawing showing a second simulation of exposed node processing in a preferred embodiment of the present invention.
Figure 12:
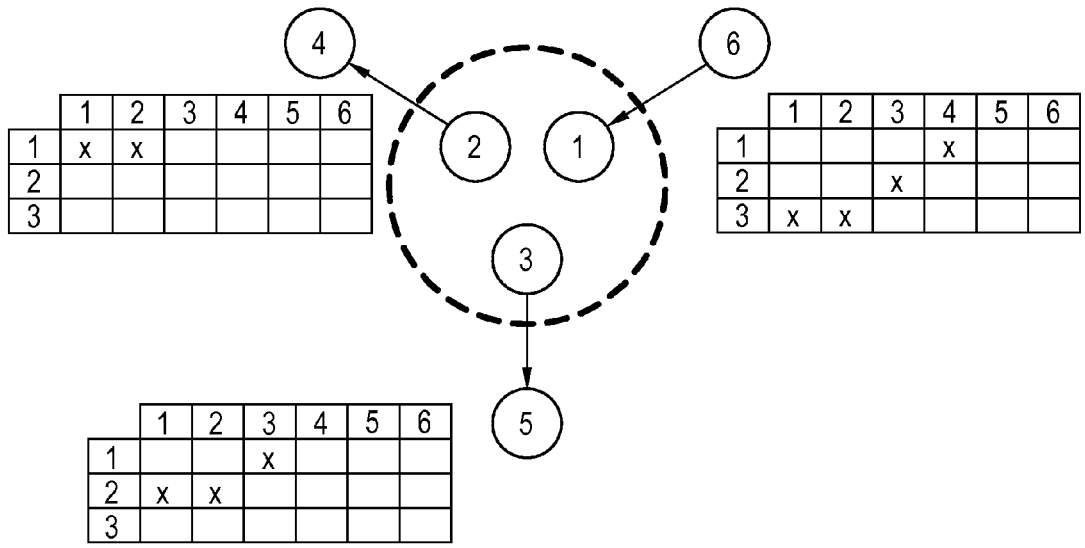

Simulation 4 has the same scenario as that in simulation 3, but multiple transmissions are not permitted on a single slot-code. When node 3 chooses 3 slots for transmission to node 5 after node 2 allocates 2 slots for transmission to node 4, node 3 makes different selection, shown in FIG. 10, from that in preceding example. Then as node 6 allocates 4 slot-codes to node 1, slots 1 and 2 are chosen because unused codes exist in these two slots.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A system for scheduling transmissions by a first node in a multiuser detector enabled mobile ad-hoc network for multiuser detection (MUD) channel reuse, the system comprising:
   a transceiver configured to receive a plurality of control messages including identities and transmit and receive conditions of a plurality of remote nodes;
   a processor configured to, based on an algorithm:
      determine from the received plurality of control messages a plurality of resource usage maps corresponding to the plurality of remote nodes, wherein the plurality of resource usage maps reflect a status of slot codes as one of FREE, RX, TX, and BUSY; and
      determine, based on combined information from the plurality of resource usage maps and resource availability criteria, an availability of code slots for receiving packets at a destination node; and
   a scheduler configured to schedule transmissions of packets from the first node to the destination node within the mobile ad-hoc network based on the determined availability of code slots for receiving packets at the destination node.

2. The system of claim 1, wherein the transceiver is configured to transmit data packets from the first node to the destination node according to a transmission schedule determined by the scheduler.

3. The system of claim 1, wherein the resource availability criteria is configured to avoid collision of the transmission of data from the first node to the destination node with data transmitted at the same time and on the same frequency from other network nodes.

4. The system of claim 1, wherein the scheduler is configured to schedule transmissions taking at least one of hidden nodes and exposed nodes into account.

5. The system of claim 1, wherein the scheduler is configured to schedule transmissions allowing multiple transmissions in a code slot to achieve maximum channel reuse as long as neighboring nodes do not receive on the same slot-code.

6. The system of claim 1, wherein the scheduler is configured to schedule transmissions between the first node and the destination node when certain other nodes cannot hear at least one of the first node and the destination node.

7. The system of claim 1, wherein the scheduler is configured to schedule transmissions so that the first node can transmit on a code-slot on which its 1 hop neighbors only observe transmission on the code-slot but do not receive on the code-slot, and if its 1 hop neighbors receive on some codes in a slot, no multiple transmissions are allowed on any individual codes in the slot.

8. The system of claim 1, wherein the scheduler is configured to schedule transmissions so that an allowed transmission occurs when multiple nodes are transmitting on one slot and one code and wherein another node is permitted to transmit because neither of the neighbors of said another node receives in the slot and on the code used by said multiple transmitting nodes.

9. A system for scheduling transmissions by a first node in a multiuser detector enabled mobile ad-hoc network for multiuser detection (MUD) channel reuse, the system comprising:
    a transceiver configured to receive a plurality of control messages including identities and transmit and receive conditions of a plurality of remote nodes;
    a processor configured to, based on an algorithm:
        determine from the received plurality of control messages a plurality of resource usage maps corresponding to the plurality of remote nodes; and
        determine, based on combined information from the plurality of resource usage maps and resource availability criteria, an availability of code slots for receiving packets at a destination node; and
    a scheduler configured to schedule transmissions of packets from the first node to the destination node within the mobile ad-hoc network based on the determined availability of code slots for receiving packets at the destination node,
    wherein the resource availability criteria are that no 1-hop neighbors are receiving on a slot-code, thus to avoid collision, the destination node doesn't transmit in the code slot, thus satisfying the half-duplex constraint at the receiver;
        the destination node doesn't receive on the slot-code, thus to avoid collision; the destination node doesn't have the slot-code marked as "busy", which is to avoid collision; and
        a local node neither transmits nor receives in the slot, as only one transmission is possible per slot, thus satisfying the half-duplex constraint at the transmitter.

10. A system for scheduling transmissions by a first node in a multiuser detector enabled mobile ad-hoc network for multiuser detection (MUD) channel reuse, the system comprising:
    a transceiver configured to receive a plurality of control messages including identities and transmit and receive conditions of a plurality of remote nodes;
    a processor configured to, based on an algorithm:
        determine from the received plurality of control messages a plurality of resource usage maps corresponding to the plurality of remote nodes; and
        determine, based on combined information from the plurality of resource usage maps and resource availability criteria, an availability of code slots for receiving packets at a destination node; and
    a scheduler configured to schedule transmissions of packets from the first node to the destination node within the mobile ad-hoc network based on the determined availability of code slots for receiving packets at the destination node, wherein the scheduler is configured to:
        calculate a desired number of transmit code slots for data packets to be transmitted along with an identification of the destination node; and
        find, based on the desired number of transmit code slots and the identification of the destination node, available code slots by applying the availability criteria to information from a resource usage table derived from the resource usage maps that compiles all of the nodes views of all of the transmit and receive conditions of all of the nodes.

11. A method for scheduling transmissions by a first node in a multiuser detector enabled mobile ad-hoc network for MUD channel reuse, the method comprising:
    receiving a plurality of control messages including identities and transmit and receive conditions of a plurality of remote nodes;
    determining from the received plurality of control messages a plurality of resource usage maps corresponding to the plurality of remote nodes, wherein the plurality of resource usage maps reflect a status of slot codes as one of FREE, RX, TX, and BUSY;
    determining, based on combined information from the plurality of resource usage maps and resource availability criteria, an availability of code slots for receiving packets at a destination node; and
    scheduling transmissions of packets from the first node to the destination node within the mobile ad-hoc network based on the determined availability of code slots for receiving packets at the destination node.

12. The method of claim 11, comprising transmitting data packets from the first node to the destination node according to a transmission schedule determined by the scheduler.

13. The method of claim 11, wherein scheduling transmissions includes avoiding collision of the transmission of data from the first node to the destination node with data transmitted at the same time and on the same frequency from other network nodes.

14. The method of claim 11, wherein scheduling transmissions includes taking at least one of hidden nodes and exposed nodes into account.

15. The method of claim 11, wherein scheduling transmissions includes allowing multiple transmissions in a code slot to achieve maximum channel reuse as long as neighboring nodes do not receive on the same slot-code.

16. The method of claim 11, wherein scheduling transmissions includes scheduling transmissions between the first node and the destination node when certain other nodes cannot hear at least one of the first node and the destination node.

17. The method of claim 11, wherein scheduling transmissions includes scheduling transmissions so that a node can transmit on a code-slot on which its 1 hop neighbors only observe transmission on the code-slot but do not receive on the code-slot, and if its 1 hop neighbors receive on some codes in a slot, no multiple transmissions are allowed on any individual codes in the slot.

18. The method of claim 11, wherein scheduling transmissions includes schedule transmissions so that an allowed transmission occurs when multiple nodes are transmitting on one slot and one code and wherein another node is permitted to transmit because neither of the neighbors of said another node receives in the slot and on the code used by said multiple transmitting nodes.

19. A method for scheduling transmissions by a first node in a multiuser detector enabled mobile ad-hoc network for MUD channel reuse, the method comprising:

receiving a plurality of control messages including identities and transmit and receive conditions of a plurality of remote nodes;

determining from the received plurality of control messages a plurality of resource usage maps corresponding to the plurality of remote nodes;

determining, based on combined information from the plurality of resource usage maps and resource availability criteria, an availability of code slots for receiving packets at a destination node; and scheduling transmissions of packets from the first node to the destination node within the mobile ad-hoc network based on the determined availability of code slots for receiving packets at the destination node, wherein the resource availability criteria are that no 1-hop neighbors are receiving on the slot-code, thus to avoid collision, the destination node doesn't transmit in the code slot, thus satisfying the half-duplex constraint at the receiver;

the destination node doesn't receive on the slot-code, thus to avoid collision; the destination node doesn't have the slot-code marked as "busy", which is to avoid collision; and a local node neither transmits nor receives in the slot, as only one transmission is possible per slot, thus satisfying the half-duplex constraint at the transmitter.

20. A method for scheduling transmissions by a first node in a multiuser detector enabled mobile ad-hoc network for MUD channel reuse, the method comprising:

receiving a plurality of control messages including identities and transmit and receive conditions of a plurality of remote nodes;

determining from the received plurality of control messages a plurality of resource usage maps corresponding to the plurality of remote nodes;

determining, based on combined information from the plurality of resource usage maps and resource availability criteria, an availability of code slots for receiving packets at a destination node; and scheduling transmissions of packets from the first node to the destination node within the mobile ad-hoc network based on the determined availability of code slots for receiving packets at the destination node, wherein scheduling transmissions includes:

calculating a desired number of transmit code slots for data packets to be transmitted along with an identification of the destination node; and finding, based on the desired number of transmit code slots and the identification of the destination node, available code slots by applying the availability criteria to information from a resource usage table derived from the resource usage maps that compiles all of the nodes views of all of the transmit and receive conditions of all of the nodes.

21. A non-transitory computer readable medium storing a computer program, executable by a machine, for scheduling transmissions by a first node in a multiuser detector enabled mobile ad-hoc network for MUD channel reuse, the computer program comprising executable instructions for:

receiving a plurality of control messages including identities and transmit and receive conditions of a plurality of remote nodes;

determining from the received plurality of control messages a plurality of resource usage maps corresponding to the plurality of remote nodes, wherein the plurality of resource usage maps reflect a status of slot codes as one of FREE, RX, TX, and BUSY;

determining, based on combined information from the plurality of resource usage maps and resource availability criteria, an availability of code slots for receiving packets at a destination node; and scheduling transmissions of packets from the first node to the destination node within the mobile ad-hoc network based on the determined availability of code slots for receiving packets at the destination node.

* * * * *